United States Patent
Siboldi et al.

(10) Patent No.: US 12,260,169 B2
(45) Date of Patent: Mar. 25, 2025

(54) USING LIGHTWEIGHT REFERENCES TO PRESENT A WORKSHEET

(71) Applicant: SIGMA COMPUTING, INC., San Francisco, CA (US)

(72) Inventors: Massimo D. Siboldi, San Francisco, CA (US); Jason D. Frantz, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 16/874,447

(22) Filed: May 14, 2020

(65) Prior Publication Data

US 2020/0372210 A1 Nov. 26, 2020

Related U.S. Application Data

(60) Provisional application No. 62/852,082, filed on May 23, 2019.

(51) Int. Cl.
*G06F 40/18* (2020.01)

(52) U.S. Cl.
CPC .................. *G06F 40/18* (2020.01)

(58) Field of Classification Search
CPC .......... G06F 17/24; G06F 17/25; G06F 40/18; G06T 11/60; A63F 2300/5553; A63F 2300/6623
USPC .......... 715/201, 202, 230, 255, 217
See application file for complete search history.

(56) References Cited

U.S. PATENT DOCUMENTS

| | | | | |
|---|---|---|---|---|
| 2003/0018644 A1* | 1/2003 | Bala | ................. | G06F 40/18 |
| 2004/0163050 A1* | 8/2004 | Matter | ................. | G06F 40/123 |
| | | | | 715/255 |
| 2006/0095447 A1* | 5/2006 | Dickinson | ............. | G06F 16/20 |
| 2007/0220415 A1* | 9/2007 | Cheng | ................. | G06F 15/00 |
| | | | | 715/212 |
| 2012/0330995 A1* | 12/2012 | Muenkel | ............. | G06F 40/18 |
| | | | | 715/219 |
| 2014/0280193 A1* | 9/2014 | Cronin | ................. | G06F 16/244 |
| | | | | 707/741 |
| 2014/0372933 A1* | 12/2014 | Shirolkar | ............. | G06F 40/18 |
| | | | | 715/780 |
| 2015/0269263 A1* | 9/2015 | De Andrade | ......... | H04L 67/06 |
| | | | | 707/754 |

(Continued)

FOREIGN PATENT DOCUMENTS

WO 2014190031 A2 11/2014

OTHER PUBLICATIONS

"Dptutorials, How To Prevent Users From Deleting Rows and Columns in Excel, May 7, 2019" (Year: 2019).*

(Continued)

*Primary Examiner* — Toan H Vu

(57) ABSTRACT

Using lightweight references to present a worksheet including receiving, from a first user account, a request for a worksheet presenting a data set from a database, wherein the worksheet was generated by a second user account; determining that the request was not generated from the second user account; and in response to the determination that the request is not from the second user account, presenting the worksheet in a view mode, wherein permissions in the view mode prevent destructive edits to the worksheet and allow additive edits to the worksheet.

18 Claims, 8 Drawing Sheets

(56) References Cited

U.S. PATENT DOCUMENTS

| | | | |
|---|---|---|---|
| 2016/0019281 A1* | 1/2016 | Hariharan | G06F 16/13 |
| | | | 707/783 |
| 2016/0277487 A1* | 9/2016 | Simon | H04L 67/104 |
| 2017/0371881 A1* | 12/2017 | Reynolds | G06F 16/21 |
| 2018/0157468 A1 | 6/2018 | Stachura | |
| 2019/0095413 A1* | 3/2019 | Davis | H04L 67/565 |
| 2019/0179501 A1* | 6/2019 | Seeley | G06F 16/178 |
| 2019/0205400 A1* | 7/2019 | Puzicha | H04L 51/18 |
| 2020/0034681 A1* | 1/2020 | Carver | G06N 5/041 |
| 2021/0232536 A1* | 7/2021 | Nag | G06F 40/186 |

OTHER PUBLICATIONS https://www.dptutorials.com/post/how-to-prevent-users-from-deleting-rows-and-columns-in-excel (Year: 2019).*

PCTUS2020033104, International Search Report and Written Opinion, Aug. 10, 2020, 9 pages.

Anonymous, "Disable "Download, Print and Copy" Features for Google Files," NC State University Office of Information Technology, https://web.archive.org/web/20190424233732/https://oit.ncs.edu/, Aug. 17, 2015, 5 pages.

Anonymous, "How Do I Share a Google Sheet with 'Read Only' Permissions?" Web Applications Stack Exchange, https://webapps.stackexchange.com/questions/103843/how-do-i-share-a-google-sheet-with-read-only-permissions, Mar. 7, 2017, 3 pages.

* cited by examiner

USING LIGHTWEIGHT REFERENCES TO PRESENT A WORKSHEET

CROSS-REFERENCE TO RELATED APPLICATIONS

This application is a non-provisional application for patent entitled to a filing date and claiming the benefit of earlier-filed U.S. Provisional Patent Application Ser. No. 62/852,082, filed May 23, 2019.

BACKGROUND

Field of the Invention

The field of the invention is data processing, or, more specifically, methods, apparatus, and products for using lightweight references to present a worksheet.

Description of Related Art

Modern businesses may store large amounts of data in remote databases within cloud-based data warehouses. This data may be accessed using database query languages, such as structured query language (SQL). Further, manipulating the data stored in the database may require constructing complex queries beyond the abilities of most users.

SUMMARY

Methods, systems, and apparatus for using lightweight references to present a worksheet. Using lightweight references to present a worksheet includes receiving, from a first user account, a request for a worksheet presenting a data set from a database, wherein the worksheet was generated by a second user account; determining that the request was not generated from the second user account; and in response to the determination that the request is not from the second user account, presenting the worksheet in a view mode, wherein permissions in the view mode prevent destructive edits to the worksheet and allow additive edits to the worksheet.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
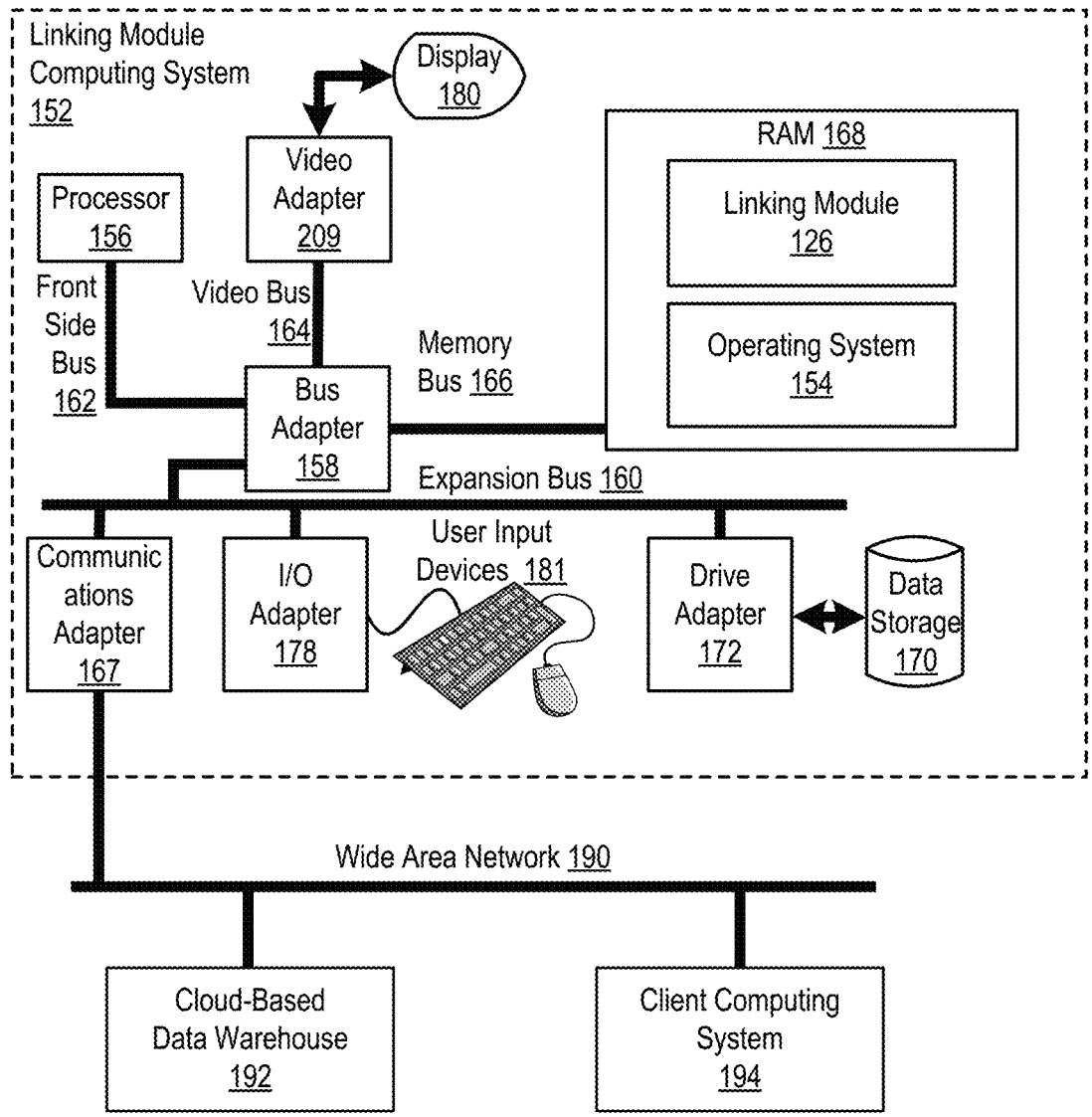
FIG. 1 sets forth a block diagram of an example system configured for using lightweight references to present a worksheet according to embodiments of the present invention.

Exemplary methods, apparatus, and products for using lightweight references to present a worksheet in accordance with the present invention are described with reference to the accompanying drawings, beginning with FIG. 1. FIG. 1 sets forth a block diagram of automated computing machinery comprising an exemplary linking module computing system (152) configured for using lightweight references to present a worksheet according to embodiments of the present invention. The linking module computing system (152) of FIG. 1 includes at least one computer processor (156) or 'CPU' as well as random access memory (168) ('RAM') which is connected through a high speed memory bus (166) and bus adapter (158) to processor (156) and to other components of the linking module computing system (152).

Stored in RAM (168) is an operating system (154). Operating systems useful in computers configured for using lightweight references to present a worksheet according to embodiments of the present invention include UNIX™, Linux™, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the linking module (126), a module for using lightweight references to present a worksheet according to embodiments of the present invention.

The linking module computing system (152) of FIG. 1 includes disk drive adapter (172) coupled through expansion bus (160) and bus adapter (158) to processor (156) and other components of the linking module computing system (152). Disk drive adapter (172) connects non-volatile data storage to the linking module computing system (152) in the form of data storage (170). Disk drive adapters useful in computers configured for using lightweight references to present a worksheet according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example linking module computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example linking module computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary linking module computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for using lightweight references to present a worksheet according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the linking module (126) on the computing system (152).

Figure 2:
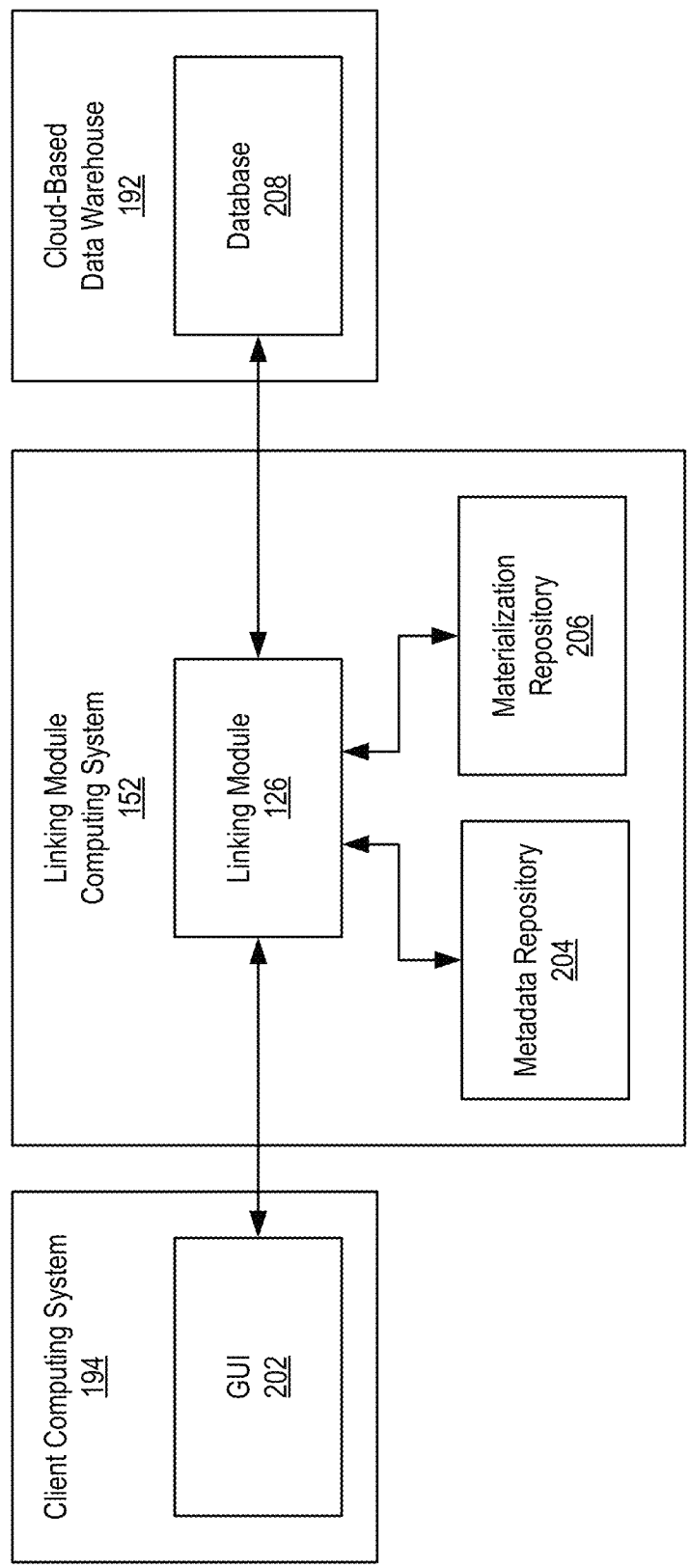
FIG. 2 sets forth a block diagram of an example system configured for using lightweight references to present a worksheet according to embodiments of the present invention.

FIG. 2 shows an exemplary system for using lightweight references to present a worksheet according to embodiments of the present invention. As shown in FIG. 2, the system includes a client computing system (194), a linking module computing system (152), and a cloud-based data warehouse (192). The client computing system (194) includes a graphical user interface (GUI) (202). The linking module computing system (152) includes a linking module (126), a metadata repository (204), and a materialization repository (206). The cloud-based data warehouse (192) includes a database (208).

The GUI (202) is a visual presentation configured to present data sets in the form of a worksheet and graphical elements to a client and receives client input from the client. The GUI (202) may be presented, in part, by the linking module (126) and displayed on a client computing system (194) (e.g., on a system display or mobile touchscreen). The linking module (126) may be part of an Internet application hosted on the linking module computing system (152) and initiate the presentation of the GUI (202) on the client computing system (194).

A worksheet is a presentation of a data set from a database (208). A referencing worksheet is a worksheet that is linked from another worksheet (referred to as a data source worksheet). The referencing worksheet inherits the data set presented in the data source worksheet (i.e., data not excluded from presentation). The referencing worksheet may also inherit the results of formula applied to other data but not the formulas themselves. The referencing worksheet may be limited to the data set presented or otherwise made available in the data source worksheet (unless the user generating the referencing worksheet has access to excluded data in the database). A referencing worksheet may be linked from any number of data sources, including multiple data source worksheets.

A lightweight referencing worksheet is a referencing worksheet generated dynamically in response to a request for a data source worksheet by the non-owner of the data source worksheet. The lightweight referencing worksheet is lightweight in the sense that the worksheet is generated dynamically and is presented in a view mode with certain permissions that prevent destructive edits to the worksheet and allow additive edits to the worksheet. Such permissions may allow adding filters to the worksheet, adding columns to the worksheet, changing a format of data in a column of the worksheet, and converting the worksheet to a new worksheet with different permissions. Such permissions may prevent viewing formulas in a column of the worksheet, destructively modifying a hierarchy of columns in the worksheet, changing a data source of the worksheet, changing an existing filter in the worksheet, viewing a collapsed level in the worksheet, viewing a hidden column in the worksheet, and editing a chart in the worksheet.

The linking module (126) is hardware, software, or an aggregation of hardware and software configured to receive requests from the client computing system (194), via the GUI (GUI). Each request may be associated with, and originate from, a user account. The linking module (126) is also configured to generate database queries in response to requests for data sets and manipulations of those data sets. The linking module (126) may also be configured to retrieve stored worksheets from the materialization repository (206) for presentation via the GUI (202). The linking module (126) may be part of a database query generator that generates the database query. The database query may be populated based on the worksheet metadata.

The linking module (126) presents, via the GUI (202), a worksheet using the information in the worksheet metadata. Worksheet metadata is data that describes a worksheet. Specifically, the worksheet metadata may include a description of the data set, the formulas to be applied to the data set, and the presentation structure of the data set. The description of the data set describes which data is to be requested via the database query or the materialization repository (206). The description of the data set may include which columns and rows of data are to be retrieved from the database (208) via the database query. The formulas to be applied to the data set may include the manipulations of the data in the columns and rows received in the data set. Such manipulations may include calculation columns that apply a formula to data in the data set.

The presentation structure of the data set may include presentation selections made by a user. The presentation structure may include the hierarchical relationship between the columns, filters applied to the data, and the manner in which the data is sorted. The presentation structure of the data set may also include the GUI visibility of particular data within the data set. GUI visibility may be altered based on filter settings of the data or on the visibility status (e.g., hidden or not hidden) of a column within the data set. The presentation structure of the data set may also include the formatting of the worksheet, such as the size of rows and columns.

Worksheet metadata may also include a reference to, or identifier of, the worksheet metadata for a different worksheet. For example, the worksheet metadata for a referencing worksheet may include a reference to the data source worksheet from which the referencing worksheet was linked. Further, referencing worksheet metadata may lack a reference to the database or data set upon which the data source worksheet was built. Rather, the referencing worksheet metadata may only include a reference to the data source worksheet metadata, and that reference is used to retrieve the data source worksheet metadata. Because the referencing worksheet metadata may lack a reference to the database or data set, both the referencing worksheet metadata and data source worksheet metadata are used to generate the database query.

The metadata repository (204) is an aggregation of hardware and software used to store worksheet metadata. Worksheet metadata may be retrieved from the metadata repository (204) using a reference to, or identifier of, the worksheet metadata. The materialization repository is an aggregation of hardware and software used to store data sets for presentation in a worksheet. A worksheet may be marked for materialization and the data set presented in the worksheet is stored locally to increase access speeds for the worksheet at the expense of providing the most current version of the data set. For a data set that changes infrequently relative to the frequency with which worksheets presenting the data set are accessed, marking a worksheet for materialization (i.e., instructing the linking module computing system (152) to store the data set locally) may be advantageous.

The database (208) is a collection of data and a management system for the data. A data set is a collection of data from the database (208). The data set may be an organization of data generated in response to a database query and provided to the linking module (126). The data set may include data organized into columns and rows.

Figure 3:
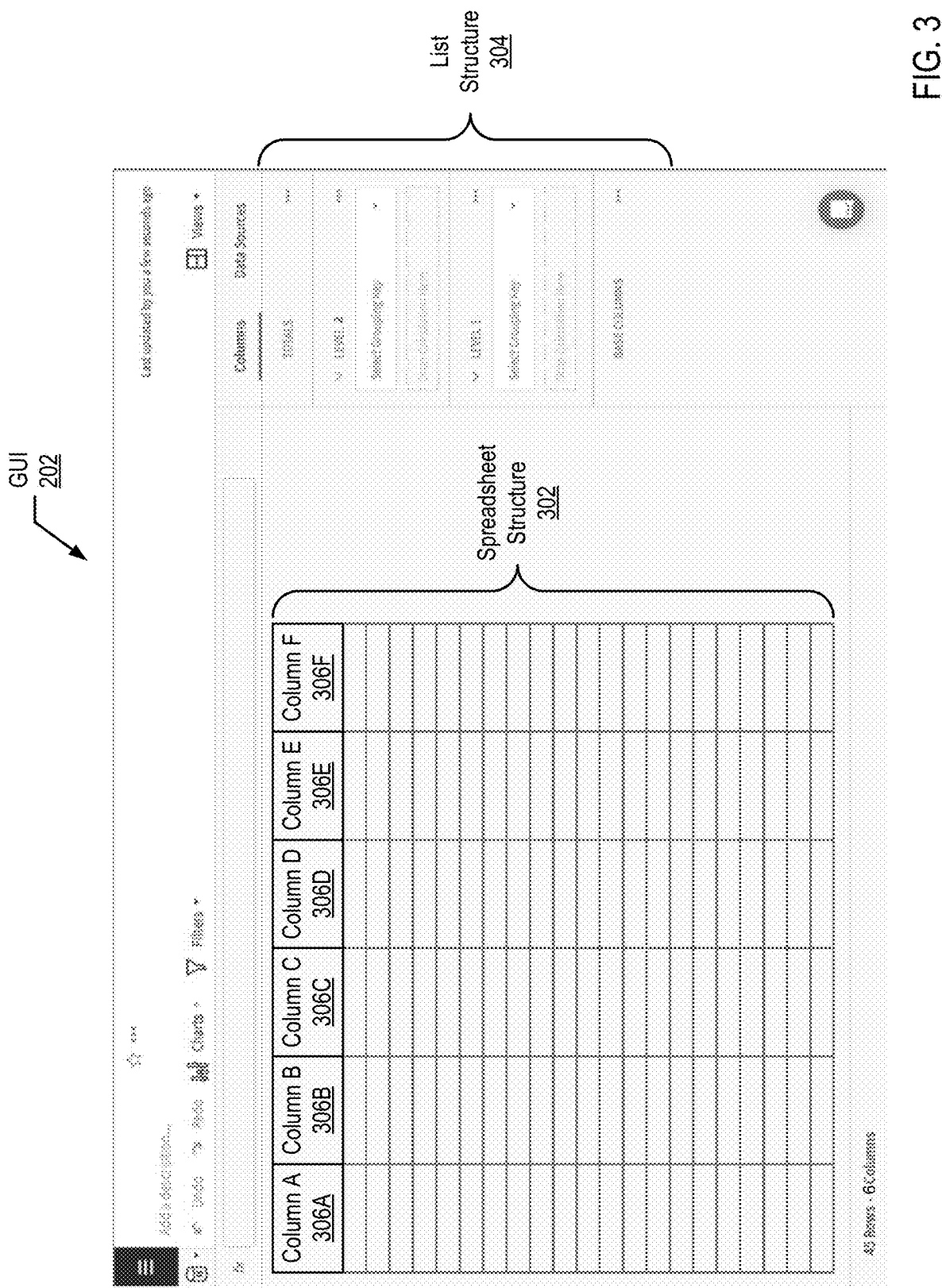
FIG. 3 sets forth an example graphical user interface configured for using lightweight references to present a worksheet according to embodiments of the present invention.

FIG. 3 shows an exemplary GUI for using lightweight references to present a worksheet according to embodiments of the present invention. As shown in FIG. 3, the exemplary GUI (202) includes a spreadsheet structure (302) and a list structure (304). The spreadsheet structure (302) includes a data set (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculations using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

For example, the cloud-based data warehouse may include a database of hotels. As shown in the example data set of Table 1, the data set may include the addresses and number of rooms for hotels in downtown Austin, Houston, and Dallas.

TABLE 1

| City | Street Name | Street Number | Hotel Name | Number of Rooms |
| --- | --- | --- | --- | --- |
| Houston | Texas Ave. | 1100 | Magnolia | 54 |
| Austin | San Jacinto St. | 700 | Omni | 65 |
| Houston | Texas Ave. | 700 | Lancaster | 62 |
| Dallas | Pacific Ave. | 1600 | Hilton | 68 |
| Austin | Brazos St. | 604 | Driskill | 58 |
| Austin | San Jacinto St. | 200 | Hampton Inn | 49 |
| Dallas | Commerce St. | 1401 | Magnolia | 35 |
| Houston | Crawford St. | 710 | Hampton Inn | 72 |
| Dallas | Main St. | 1201 | Westin | 51 |
| Dallas | Commerce St. | 1700 | Hampton Inn | 60 |
| Houston | Texas Ave. | 1520 | Westin | 44 |
| Austin | Brazos St. | 605 | Firehouse Hostel | 18 |

Assume that the city column is dragged and dropped into the first (top) level of the list structure as the first key. Assume further, that the street name column is dragged and dropped into the second (bottom) level of the list structure as the second key. A database query is then generated that groups the data rows first by street name, then by city. The database query is sent to the cloud-based data warehouse, and in response, the linking module receives a reconfigured data set and presents the data set in a worksheet as shown in Table 2.

TABLE 2

| City | Street Name | Street Number | Hotel Name | Number of Rooms |
| --- | --- | --- | --- | --- |
| Austin | Brazos St. | 604 | Driskill | 58 |
|  |  | 605 | Firehouse Hostel | 18 |
|  | San Jacinto St. | 700 | Omni | 65 |
|  |  | 200 | Hampton Inn | 49 |
| Dallas | Commerce St. | 1401 | Magnolia | 35 |
|  |  | 1700 | Hampton Inn | 60 |
|  | Main St. | 1201 | Westin | 51 |
|  | Pacific Ave. | 1600 | Hilton | 68 |
| Houston | Crawford St. | 710 | Hampton Inn | 72 |
|  | Texas Ave. | 1520 | Westin | 44 |
|  |  | 1100 | Magnolia | 54 |
|  |  | 700 | Lancaster | 62 |

As shown in Table 2, the worksheet includes a dimensional hierarchy that is organized first by street name, then by city.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

Figure 4:
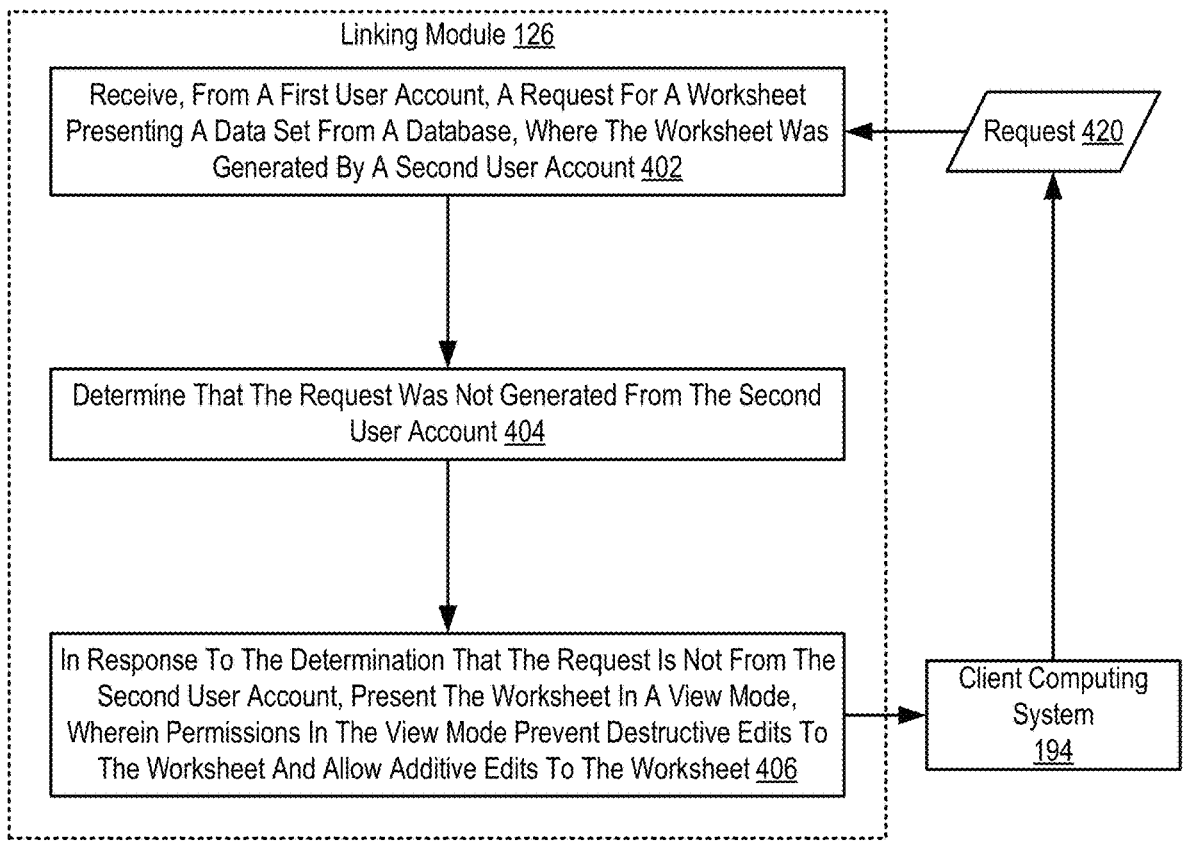
FIG. 4 sets forth a flow chart illustrating an exemplary method for using lightweight references to present a worksheet according to embodiments of the present invention.

For further explanation, FIG. 4 sets forth a flow chart illustrating an exemplary method for using lightweight references to present a worksheet according to embodiments of the present invention that includes receiving (402), from a first user account, a request (420) for a worksheet presenting a data set from a database, wherein the worksheet was generated by a second user account. Receiving (402), from a first user account, a request (420) for a worksheet presenting a data set from a database, wherein the worksheet was generated by a second user account may be carried out by a user authenticated under a first user account on the client computing system (194) sending the request (420) that includes an identifier of the worksheet. Each user creating worksheets or requesting worksheets from the linking module computing system may be associated with a user account. A user account identifies an authenticated user and is associated with different levels of access to worksheets. The worksheet metadata may include an identifier of the user account that owns the worksheet.

The method of FIG. 4 further includes determining (404) that the request (420) was not generated from the second user account. Determining (404) that the request (420) was not generated from the second user account may be carried out by the linking module (126) inspecting the request (420), extracting the user account information associated with the request (420), extracting the user account information from the requested worksheet metadata, and comparing the user account associated with the request to the user account associated with ownership of the requested worksheet. Based upon a comparison of the first user account and the second user account, the linking module (126) may determine that the request was not generated from the second user account.

The method of FIG. 4 further includes, in response to the determination that the request (420) is not from the second user account, presenting (406) the worksheet in a view mode, wherein permissions in the view mode prevent destructive edits to the worksheet and allow additive edits to the worksheet. The worksheet presented may be a lightweight referencing worksheet. Specifically, presenting (406) the worksheet in a view mode, wherein permissions in the view mode prevent destructive edits to the worksheet and allow additive edits to the worksheet may be carried out by the linking module (126) retrieving worksheet metadata for the worksheet using a reference to the worksheet metadata in the request (420); creating, using the worksheet metadata, a lightweight referencing worksheet presenting at least a subset of the data set presented in the worksheet; and presenting the lightweight referencing worksheet in the view mode with permissions that prevent destructive edits to the lightweight referencing worksheet and allow additive edits to the lightweight referencing worksheet.

The permissions may not be associated with a specific user. Rather, the permissions may be applied to any non-owner user requesting access to the worksheet. The non-owner user may also need general permission to access the worksheet at all, including with view mode permissions.

The above limitations improve the operation of the computer system by reducing the complexity of accessing a worksheet and interacting with the presented data set. Using a worksheet to present a data set may present problems if the permissions are binary in that they either prevent or allow any manipulations or changes. If a non-owner is granted full access to worksheet that user does not own, the user may make changes (inadvertently or otherwise) that the owner does not desire. Conversely, if a non-owner is prevented from making any manipulations or additive changes to the worksheet, that worksheet may not be of much use to the non-owner. Presenting the worksheet in a specialized view mode with permissions that prevent destructive edits to the worksheet and allow additive edits to the worksheet provides both some benefits of full access with security features similar to providing read-only access.

Figure 5:
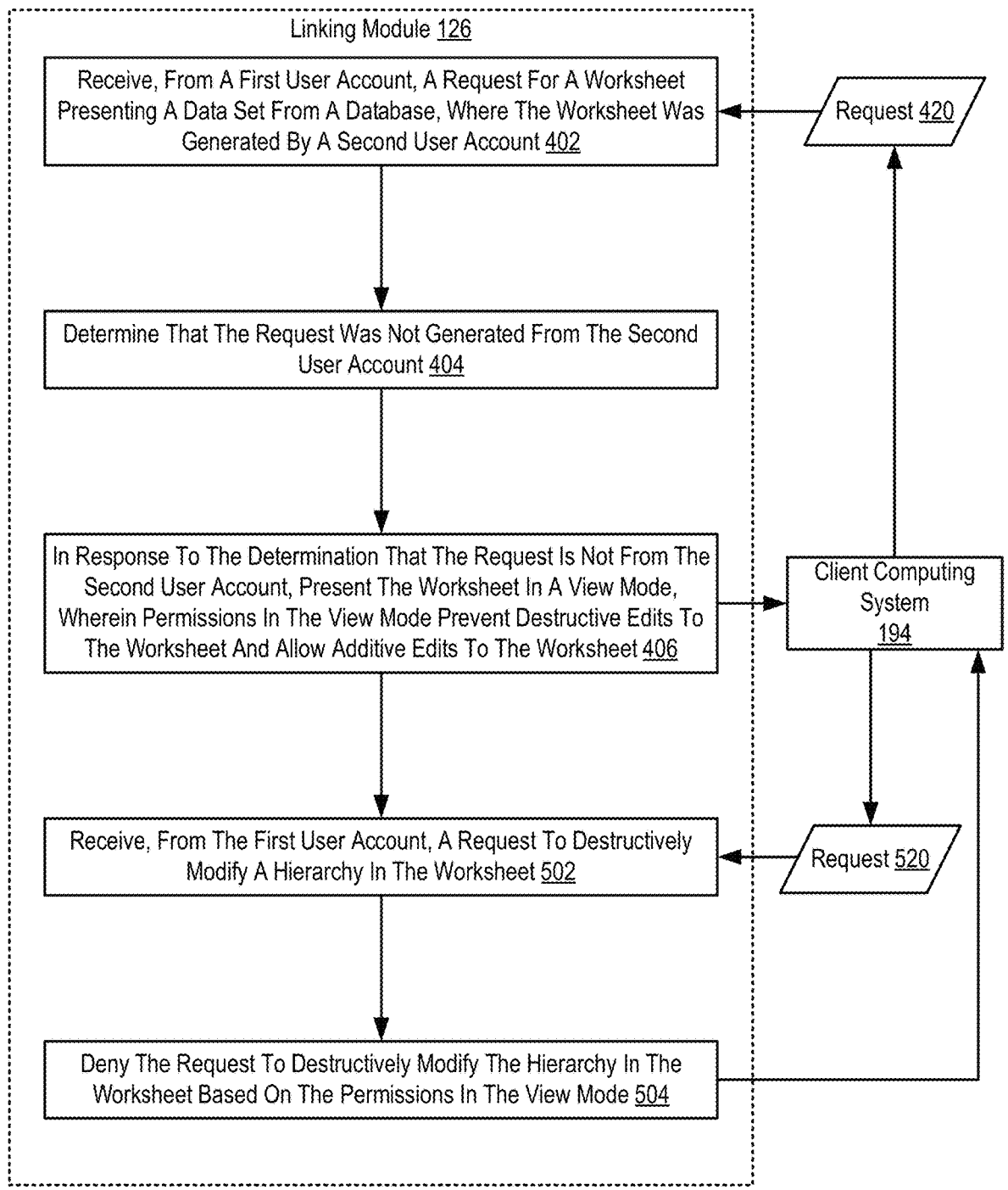
FIG. 5 sets forth a flow chart illustrating an exemplary method for using lightweight references to present a worksheet according to embodiments of the present invention.

For further explanation, FIG. 5 sets forth a flow chart illustrating a further exemplary method for using lightweight references to present a worksheet according to embodiments of the present invention that includes receiving (402), from a first user account, a request (420) for a worksheet presenting a data set from a database, wherein the worksheet was generated by a second user account; determining (404) that the request (420) was not generated from the second user account; and in response to the determination that the request (420) is not from the second user account, presenting (406) the worksheet in a view mode, wherein permissions in the view mode prevent destructive edits to the worksheet and allow additive edits to the worksheet.

The method of FIG. 5 differs from the method of FIG. 4, however, in that the method of FIG. 5 further includes receiving (502), from the first user account, a request (520) to destructively modify a hierarchy in the worksheet. Receiving (502), from the first user account, a request (520) to destructively modify a hierarchy in the worksheet may be carried out by the linking module (126) inspecting the request (520) and extracting the type of request and the user account information associated with the request. Destructively modifying a hierarchy in a worksheet may include removing a level from the hierarchy or rearranging the existing levels of the hierarchy. Additively modifying a hierarchy may include adding level above or below the existing hierarchy, including adding a base level or total level.

The method of FIG. 5 further includes denying (504) the request (520) to destructively modify the hierarchy in the worksheet based on the permissions in the view mode may be carried out by the linking module (126) comparing the type of request (i.e., the request to destructively modify a hierarchy) to the activities allowed under the permissions of the view mode. Because destructively modifying a hierarchy of a worksheet in view mode is not allowed under the permissions, the request (520) is denied.

Figure 6:
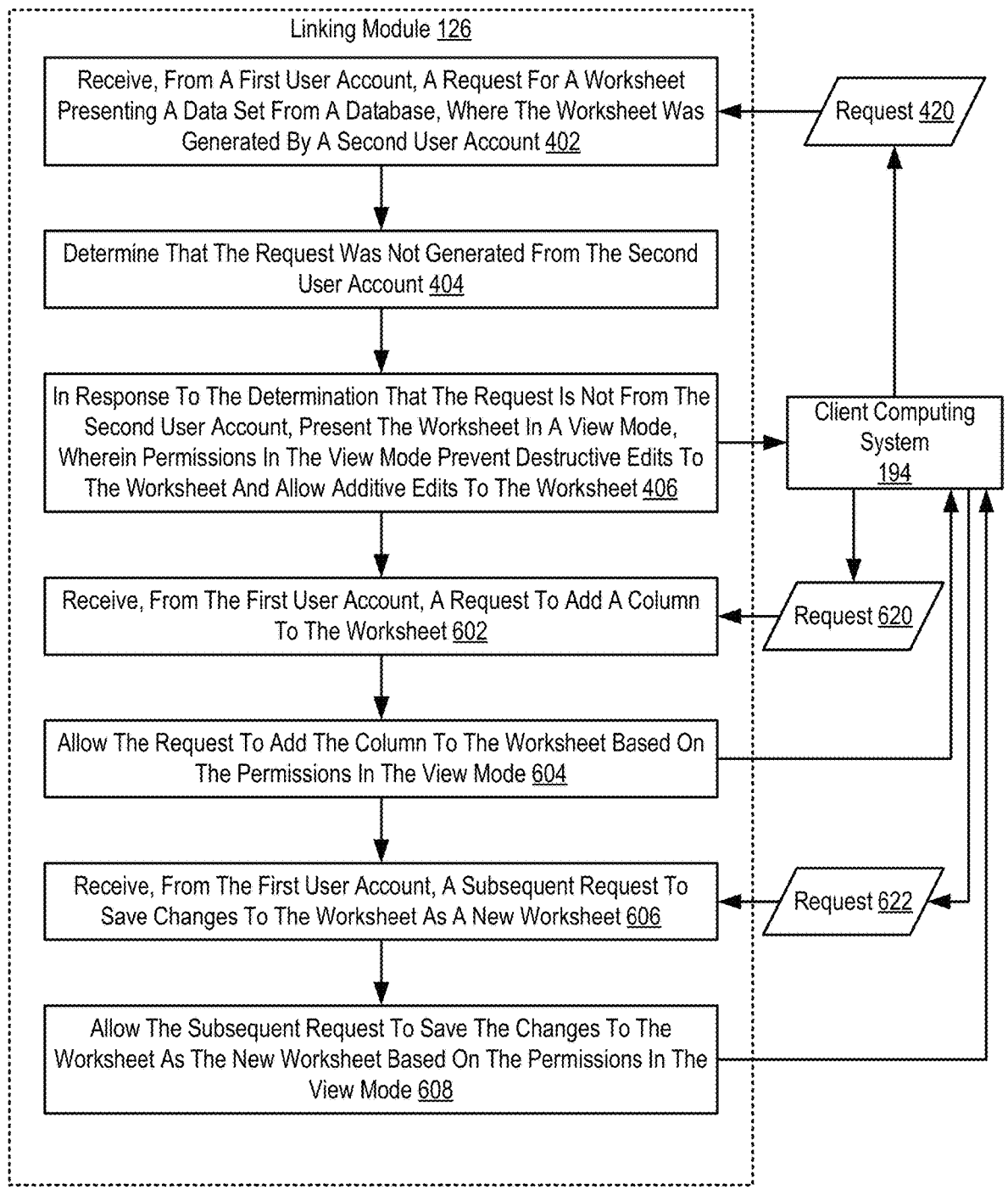
FIG. 6 sets forth a flow chart illustrating an exemplary method for using lightweight references to present a worksheet according to embodiments of the present invention.

For further explanation, FIG. 6 sets forth a flow chart illustrating a further exemplary method for using lightweight references to present a worksheet according to embodiments of the present invention that includes receiving (402), from a first user account, a request (420) for a worksheet presenting a data set from a database, wherein the worksheet was generated by a second user account; determining (404) that the request (420) was not generated from the second user account; and in response to the determination that the request (420) is not from the second user account, presenting (406) the worksheet in a view mode, wherein permissions in the view mode prevent destructive edits to the worksheet and allow additive edits to the worksheet.

The method of FIG. 6 differs from the method of FIG. 4, however, in that the method of FIG. 6 further includes receiving (602), from the first user account, a request (620) to add a column to the worksheet. Receiving (602), from the first user account, a request (620) to add a column to the worksheet may be carried out by the linking module (126) inspecting the request (620) and extracting the type of request and the user account information associated with the request.

The method of FIG. 6 further includes allowing (604) the request (620) to add the column to the worksheet based on the permissions in the view mode. Allowing (604) the request (620) to add the column to the worksheet based on the permissions in the view mode may be carried out by the linking module (126) comparing the type of request (i.e., the request to add a column) to the activities allowed under the permissions of the view mode. Because adding a column to a worksheet in view mode is allowed under the permissions, the request (520) is allowed.

The method of FIG. 6 further includes receiving (606), from the first user account, a subsequent request (622) to save changes to the worksheet as a new worksheet. Receiving (606), from the first user account, a subsequent request (622) to save changes to the worksheet as a new worksheet may be carried out by the linking module (126) inspecting the request (622) and extracting the type of request and the user account information associated with the request.

The method of FIG. 6 further includes allowing (608) the subsequent request (622) to save the changes to the worksheet as the new worksheet based on the permissions in the view mode. Allowing (608) the subsequent request (622) to save the changes to the worksheet as the new worksheet based on the permissions in the view mode may be carried out by the linking module (126) comparing the type of request (i.e., the request to save the changes to the worksheet as the new worksheet) to the activities allowed under the permissions of the view mode. Because saving the changes to the worksheet as a new worksheet in view mode is allowed under the permissions, the request (520) is allowed.

Figure 7:
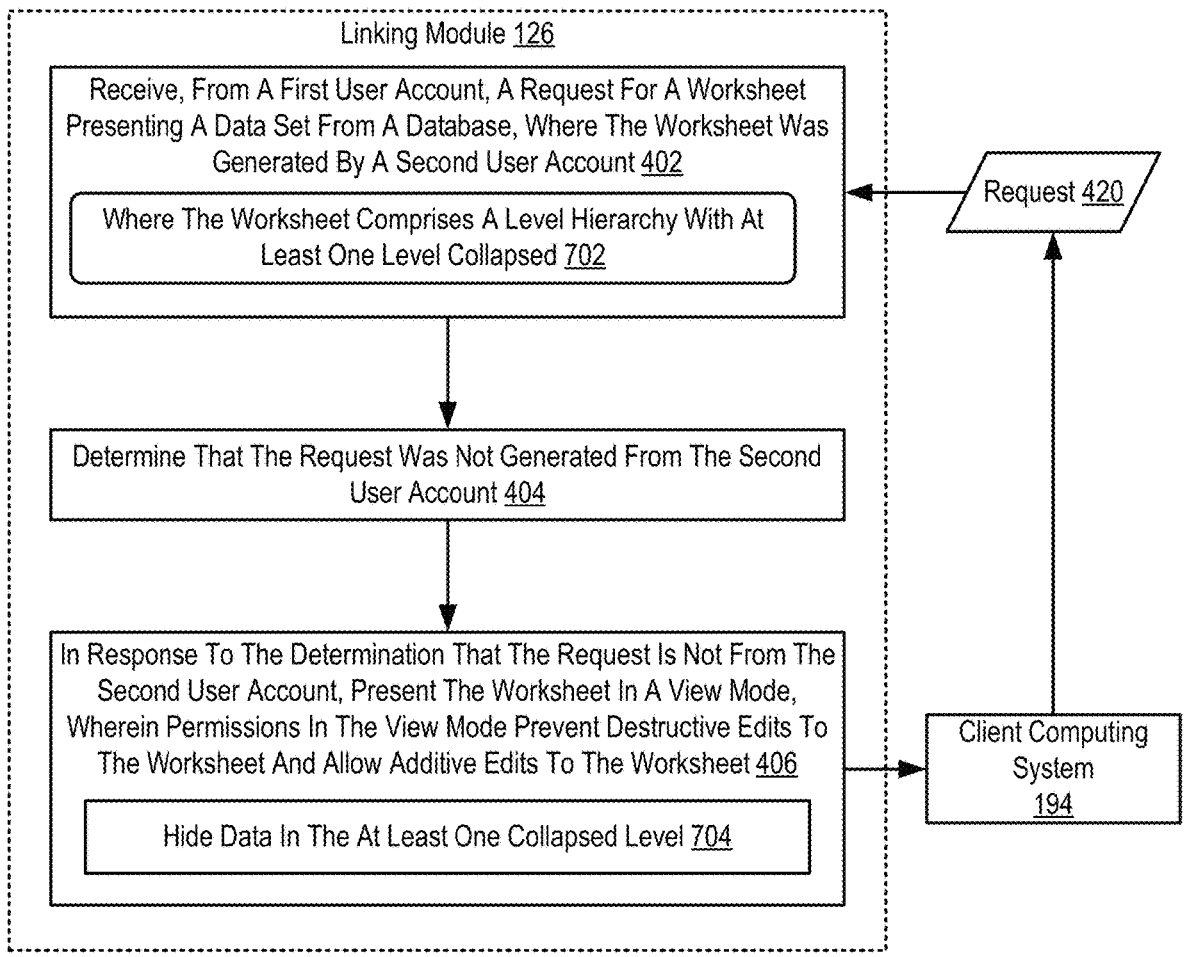
FIG. 7 sets forth a flow chart illustrating an exemplary method for using lightweight references to present a worksheet according to embodiments of the present invention.

For further explanation, FIG. 7 sets forth a flow chart illustrating a further exemplary method for using lightweight references to present a worksheet according to embodiments of the present invention that includes receiving (402), from a first user account, a request (420) for a worksheet presenting a data set from a database, wherein the worksheet was generated by a second user account; determining (404) that the request (420) was not generated from the second user account; and in response to the determination that the request (420) is not from the second user account, presenting (406) the worksheet in a view mode, wherein permissions in the view mode prevent destructive edits to the worksheet and allow additive edits to the worksheet.

The method of FIG. 7 differs from the method of FIG. 4, however, in that receiving (402), from a first user account, a request (420) for a worksheet presenting a data set from a database, wherein the worksheet was generated by a second user account includes wherein (702) the worksheet comprises a level hierarchy with at least one collapsed level. The data source worksheet from which the lightweight referencing worksheet links may include a hierarchy with multiple levels. Some of the levels may be collapsed and some may be expanded. If the data source worksheet includes a level that is collapsed, then the permissions for the lightweight referencing worksheet will deny a request by the non-owner (i.e., the first user account) to expand the collapsed level. A collapsed level may hide data in the column of the collapsed level and columns subordinate to the column of the collapsed level. For example, Table 3 shows the results of collapsing the Street Number level of Table 2. As shown in Table 3, the collapsed level (Street Number) is hidden as well as each column subordinate to Street Number (Hotel Name and Number of Rooms).

TABLE 3

| City | Street Name | Street Number | Hotel Name | Number of Rooms |
|---|---|---|---|---|
| Austin | Brazos St. | | | |
| | San Jacinto St. | | | |
| Dallas | Commerce St. | | | |
| | Main St. | | | |
| | Pacific Ave. | | | |
| Houston | Crawford St. | | | |
| | Texas Ave. | | | |

The method of FIG. 7 further differs from the method of FIG. 4 in that, in response to the determination that the request (420) is not from the second user account, presenting (406) the worksheet in a view mode, wherein permissions in the view mode prevent destructive edits to the worksheet and allow additive edits to the worksheet includes hiding (704) data in the at least one collapsed level. Hiding (704) data in the at least one collapsed level may be carried out by the linking module (126) presenting the worksheet without displaying the data in the column of the collapsed level and columns subordinate to the column of the collapsed level.

Figure 8:
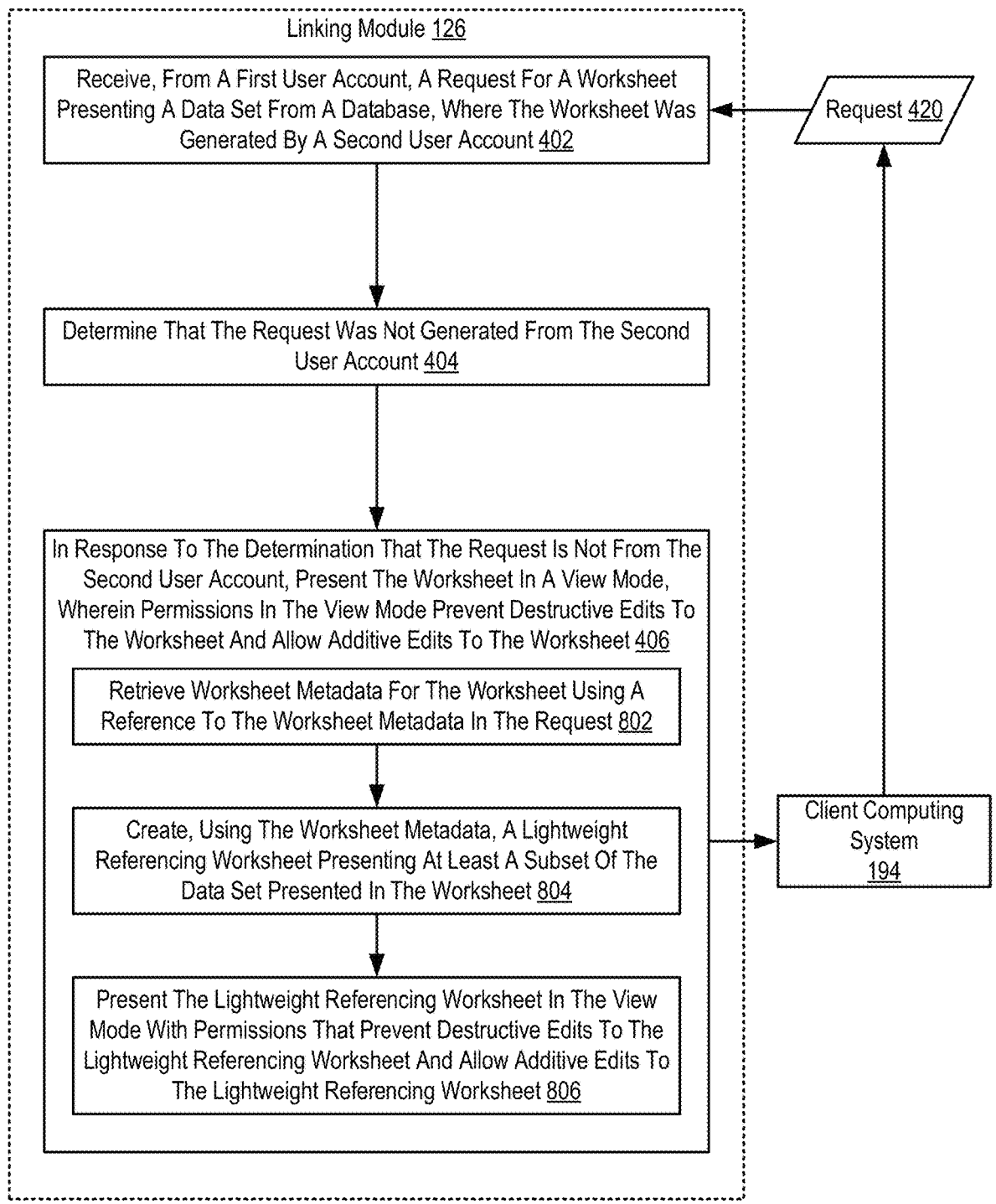
FIG. 8 sets forth a flow chart illustrating an exemplary method for using lightweight references to present a worksheet according to embodiments of the present invention.

For further explanation, FIG. 8 sets forth a flow chart illustrating a further exemplary method for using lightweight references to present a worksheet according to embodiments of the present invention that includes receiving (402), from a first user account, a request (420) for a worksheet presenting a data set from a database, wherein the worksheet was generated by a second user account; determining (404) that the request (420) was not generated from the second user account; and in response to the determination that the request (420) is not from the second user account, presenting (406) the worksheet in a view mode, wherein permissions in the view mode prevent destructive edits to the worksheet and allow additive edits to the worksheet.

The method of FIG. 8 differs from the method of FIG. 4, however, in that, in response to the determination that the request (420) is not from the second user account, presenting (406) the worksheet in a view mode, wherein permissions in the view mode prevent destructive edits to the worksheet and allow additive edits to the worksheet includes retrieving (802) worksheet metadata for the worksheet using a reference to the worksheet metadata in the request (420); creating (804), using the worksheet metadata, a lightweight referencing worksheet presenting at least a subset of the data set presented in the worksheet; and presenting (806) the lightweight referencing worksheet in the view mode with permissions that prevent destructive edits to the lightweight referencing worksheet and allow additive edits to the lightweight referencing worksheet.

Retrieving (802) worksheet metadata for the worksheet using a reference to the worksheet metadata in the request (420) may be carried out by the linking module (126) accessing the metadata repository and identifying the worksheet metadata that matches the received reference to the worksheet metadata.

Creating (804), using the worksheet metadata, a lightweight referencing worksheet presenting at least a subset of the data set presented in the worksheet may be carried out by the linking module (126) using the worksheet metadata to generate the lightweight referencing worksheet with view mode permissions. The presented worksheet may be lightweight referencing worksheet linked from the requested worksheet and using the requested worksheet as a data source worksheet.

Presenting (806) the lightweight referencing worksheet in the view mode with permissions that prevent destructive edits to the lightweight referencing worksheet and allow additive edits to the lightweight referencing worksheet may be carried out by the linking module (126) organizing the data set from the data source worksheet into the lightweight referencing worksheet with permissions that prevent destructive edits to the lightweight referencing worksheet and allow additive edits. Presenting (806) the lightweight referencing worksheet may include generating a database query using the data source worksheet metadata and sending the database query to a cloud-based data warehouse. In response, the linking module may receive the data set and organize the data set using the data source worksheet metadata and present the worksheet as a lightweight referencing worksheet in the view mode with the particular permissions.

In view of the explanations set forth above, readers will recognize that the benefits of using lightweight references to present a worksheet according to embodiments of the present invention include:
  Improving the operation of a computing system by reducing the complexity of accessing a worksheet and interacting with the presented data set, increasing computing system efficiency and usability.
  Improving the operation of a computing system by providing both benefits of full access with security features similar to providing read-only access, increasing computing system efficiency and usability.

Exemplary embodiments of the present invention are described largely in the context of a fully functional computer system for using lightweight references to present a worksheet. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of using lightweight references to present a worksheet, the method comprising:
   receiving, from a first user account, a request for a worksheet presenting a data set from a database, wherein the worksheet was generated by a second user account;
   determining that the request was not generated from the second user account by determining that user account information associated with the request differs from user account information associated with ownership of the worksheet; and
   in response to the determination that the request is not from the second user account, presenting the worksheet in a view mode,
      wherein permissions in the view mode prevent viewing hidden columns in the worksheet and changing an existing filter in the worksheet, and
      wherein the permissions in the view mode allow adding filters to the worksheet and adding columns to the worksheet.

2. The method of claim 1, further comprising:
   receiving, from the first user account, a request to modify a hierarchy in the worksheet; and
   denying the request to modify the hierarchy in the worksheet based on the permissions in the view mode.

3. The method of claim 1, further comprising:
   receiving, from the first user account, a request to add a column to the worksheet; and
   allowing the request to add the column to the worksheet based on the permissions in the view mode.

4. The method of claim 3, further comprising:
   receiving, from the first user account, a subsequent request to save changes to the worksheet as a new worksheet; and
   allowing the subsequent request to save the changes to the worksheet as the new worksheet based on the permissions in the view mode.

5. The method of claim 1, wherein the worksheet comprises a level hierarchy with at least one level collapsed, and wherein presenting the worksheet in the view mode comprises hiding data in the at least one collapsed level.

6. The method of claim 1, wherein presenting the worksheet in the view mode comprises:
   retrieving worksheet metadata for the worksheet using a reference to the worksheet metadata in the request;
   creating, using the worksheet metadata, a lightweight referencing worksheet presenting at least a subset of the data set presented in the worksheet; and
   presenting the lightweight referencing worksheet in the view mode with permissions that prevent destructive edits to the lightweight referencing worksheet and allow additive edits to the lightweight referencing worksheet.

7. An apparatus for using lightweight references to present a worksheet, the apparatus comprising a computer processor, a computer memory operatively coupled to the computer processor, the computer memory having disposed within it computer program instructions that, when executed by the computer processor, cause the apparatus to carry out the steps of:
   receiving, from a first user account, a request for a worksheet presenting a data set from a database, wherein the worksheet was generated by a second user account;
   determining that the request was not generated from the second user account by determining that user account information associated with the request differs from user account information associated with ownership of the worksheet; and
   in response to the determination that the request is not from the second user account, presenting the worksheet in a view mode,
      wherein permissions in the view mode prevent viewing hidden columns in the worksheet and changing an existing filter in the worksheet, and wherein the permissions in the view mode allow adding filters to the worksheet and adding columns to the worksheet.

8. The apparatus of claim 7, wherein the computer program instructions further cause the apparatus to carry out the steps of:
receiving, from the first user account, a request to modify a hierarchy in the worksheet; and
denying the request to modify the hierarchy in the worksheet based on the permissions in the view mode.

9. The apparatus of claim 7, wherein the computer program instructions further cause the apparatus to carry out the steps of:
receiving, from the first user account, a request to add a column to the worksheet; and
allowing the request to add the column to the worksheet based on the permissions in the view mode.

10. The apparatus of claim 9, wherein the computer program instructions further cause the apparatus to carry out the steps of:
receiving, from the first user account, a subsequent request to save changes to the worksheet as a new worksheet; and
allowing the subsequent request to save the changes to the worksheet as the new worksheet based on the permissions in the view mode.

11. The apparatus of claim 7, wherein the worksheet comprises a level hierarchy with at least one level collapsed, and wherein presenting the worksheet in the view mode comprises hiding data in the at least one collapsed level.

12. The apparatus of claim 7, wherein presenting the worksheet in the view mode comprises:
retrieving worksheet metadata for the worksheet using a reference to the worksheet metadata in the request;
creating, using the worksheet metadata, a lightweight referencing worksheet presenting at least a subset of the data set presented in the worksheet; and
presenting the lightweight referencing worksheet in the view mode with permissions that prevent destructive edits to the lightweight referencing worksheet and allow additive edits to the lightweight referencing worksheet.

13. A computer program product for using lightweight references to present a worksheet, the computer program product disposed upon a non-transitory computer readable medium, the computer program product comprising computer program instructions that, when executed, cause a computer to carry out the steps of:
receiving, from a first user account, a request for a worksheet presenting a data set from a database, wherein the worksheet was generated by a second user account;
determining that the request was not generated from the second user account by determining that user account information associated with the request differs from user account information associated with ownership of the worksheet; and
in response to the determination that the request is not from the second user account, presenting the worksheet in a view mode,
wherein permissions in the view mode prevent viewing hidden columns in the worksheet and changing an existing filter in the worksheet, and
wherein the permissions in the view mode allow adding filters to the worksheet and adding columns to the worksheet.

14. The computer program product of claim 13, wherein the computer program instructions further cause the computer to carry out the steps of:
receiving, from the first user account, a request to modify a hierarchy in the worksheet; and
denying the request to modify the hierarchy in the worksheet based on the permissions in the view mode.

15. The computer program product of claim 13, wherein the computer program instructions further cause the computer to carry out the steps of:
receiving, from the first user account, a request to add a column to the worksheet; and
allowing the request to add the column to the worksheet based on the permissions in the view mode.

16. The computer program product of claim 15, wherein the computer program instructions further cause the computer to carry out the steps of:
receiving, from the first user account, a subsequent request to save changes to the worksheet as a new worksheet; and
allowing the subsequent request to save the changes to the worksheet as the new worksheet based on the permissions in the view mode.

17. The computer program product of claim 13, wherein the worksheet comprises a level hierarchy with at least one level collapsed, and wherein presenting the worksheet in the view mode comprises hiding data in the at least one collapsed level.

18. The computer program product of claim 13, wherein presenting the worksheet in the view mode comprises:
retrieving worksheet metadata for the worksheet using a reference to the worksheet metadata in the request;
creating, using the worksheet metadata, a lightweight referencing worksheet presenting at least a subset of the data set presented in the worksheet; and
presenting the lightweight referencing worksheet in the view mode with permissions that prevent destructive edits to the lightweight referencing worksheet and allow additive edits to the lightweight referencing worksheet.

* * * * *